(12) United States Patent
Cheng et al.

(10) Patent No.: US 9,246,151 B2
(45) Date of Patent: Jan. 26, 2016

(54) ELECTRICAL CONNECTION ASSEMBLY, BATTERY DEVICE AND ELECTRONIC APPARATUS

(71) Applicant: Wistron Corporation, New Taipei (TW)

(72) Inventors: Jui-Kai Cheng, New Taipei (TW); Chien-Chih Yu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 321 days.

(21) Appl. No.: 13/800,075

(22) Filed: Mar. 13, 2013

(65) Prior Publication Data

US 2013/0288081 A1 Oct. 31, 2013

(30) Foreign Application Priority Data

Apr. 25, 2012 (TW) .............................. 101114797 A

(51) Int. Cl.
*H01M 2/20* (2006.01)
*H01R 13/24* (2006.01)
*H01R 4/48* (2006.01)
*H01R 12/71* (2011.01)

(52) U.S. Cl.
CPC ................ *H01M 2/204* (2013.01); *H01R 4/48* (2013.01); *H01R 12/716* (2013.01); *H01R 13/24* (2013.01)

(58) Field of Classification Search
CPC ...... H01M 8/204; H01R 13/24; H01R 12/716
USPC ............................................. 429/7; 439/700
See application file for complete search history.

(56) References Cited

U.S. PATENT DOCUMENTS 4,394,059 A * 7/1983 Reynolds ...................... 439/500
6,225,778 B1 5/2001 Hayama et al.
(Continued)

FOREIGN PATENT DOCUMENTS

| CN | 2807564 Y | 8/2006 |
|---|---|---|
| CN | 201708322 U | 1/2011 |
| TV | 200711564 A | 3/2007 |

(Continued)

OTHER PUBLICATIONS

China Patent Office, Office Action issued on Jan. 4, 2015.
(Continued)

*Primary Examiner* — Cynthia H Kelly
*Assistant Examiner* — Monique Wills
(74) *Attorney, Agent, or Firm* — Rabin & Berdo, P.C.

(57) ABSTRACT

An electrical connection assembly is provided to electrically connect with at least one electrical contact of an electronic apparatus. The electrical connection assembly includes an insulating casing, a circuit board and a resilient conductive element. An inner space is defined in the insulating casing, and at least one opening is defined on the insulating casing for communicating the inner space and the exterior of the insulating casing. The circuit board is disposed in the inner space of the insulating casing. The resilient conductive element includes a connecting side for fixing on and electrically connecting with the circuit board. The resilient conductive element further includes a compressible side for facing the opening and being exposed therethrough. The thickness of the resilient conductive element is reduced when an external force is applied thereon and recovers when the external force is removed.

13 Claims, 13 Drawing Sheets

(56) References Cited

U.S. PATENT DOCUMENTS

2007/0056768 A1 3/2007 Hsieh
2013/0302651 A1* 11/2013 Kim et al. .................. 429/7

FOREIGN PATENT DOCUMENTS

| TW | 530430 | B | 5/2003 |
| TW | 200711564 | A | 3/2007 |
| TW | M308542 | U | 3/2007 |
| TW | M392452 | U | 11/2010 |
| TW | M393920 | U | 12/2010 |
| TW | I354890 | B | 12/2011 |

OTHER PUBLICATIONS

Taiwan Patent Office, Office Action, Patent Application Serial No. TW101114797, Jul. 3, 2014, Taiwan.

* cited by examiner

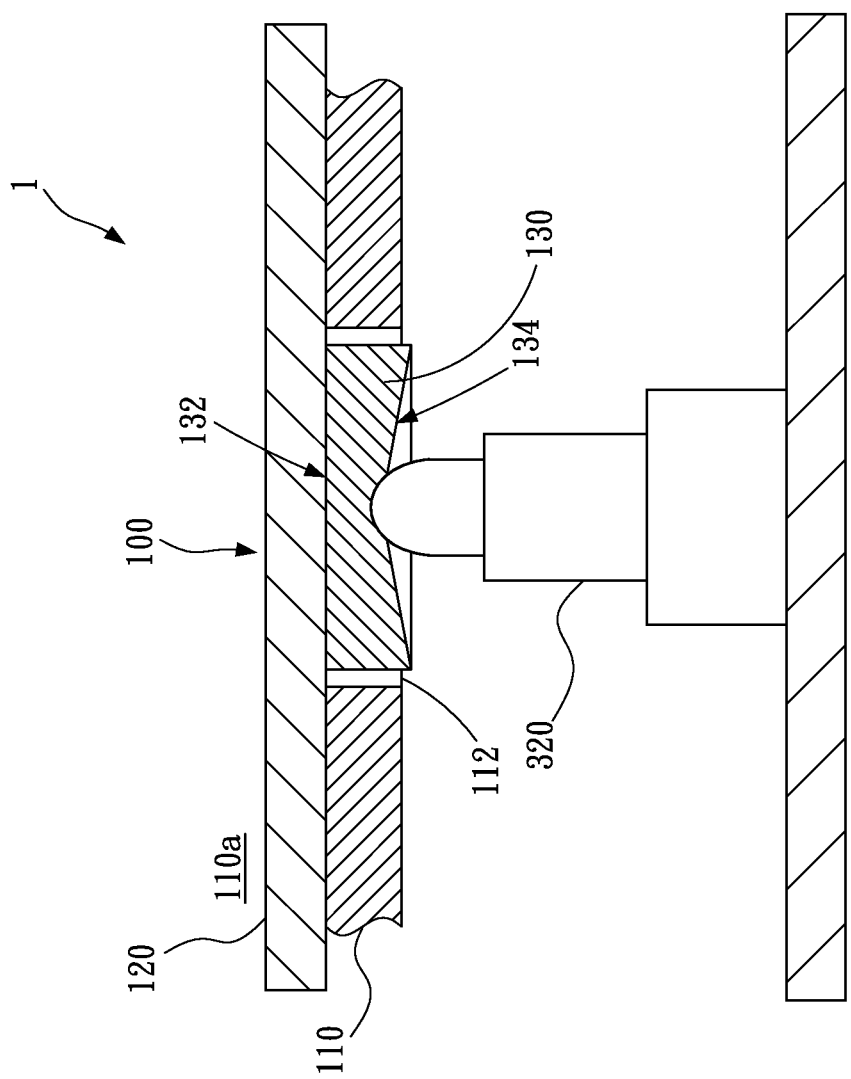

ELECTRICAL CONNECTION ASSEMBLY, BATTERY DEVICE AND ELECTRONIC APPARATUS

CROSS-REFERENCES TO RELATED APPLICATIONS

This non-provisional application claims priority under 35 U.S.C. §119(a) on Patent Application No. 101114797 filed in Taiwan, R.O.C. on 2012, Apr. 25, the entire contents of which are hereby incorporated by reference.

BACKGROUND

1. Technical Field

The disclosure relates to an electrical connection assembly, in particular to an electrical connection assembly for preventing electricity interruption, a battery device with such electrical connection assembly, and an electronic apparatus with such battery device.

2. Related Art

Portable electronic apparatuses, such as mobile phones, personal digital assistants, portable navigating devices, use batteries as their power sources. To facilitate a continuous operation of the electronic apparatus, these batteries are usually replaceable. Generally the battery is assembled in a battery base and connected to a power receiving end of the portable electronic apparatus through the battery base.

To maintain a good electrical connection between the replaceable battery and the electronic apparatus, the electrical contacts of the battery and the electrical contacts of the electronic apparatus contact each other elastically to remain tight while contacting between the electrical contacts for transmitting electricity and electrical signals. In the prior art, the "elastic contacting" is achieved by the contacting between retractable pogo pin(s) of the electronic apparatus and contact pad(s) of the battery. The retractable pogo pin retracts when contacting the contact pad and being pressed, and in the meantime an elastic force is generated to keep the tip of the retractable pogo pin continuously contacting the contact pad.

However, under the impact of an external force, the electronic apparatus is easily affected by the external force. For example, when the electronic apparatus is dropped or rolling, and vibrations or impacts are generated, an instant relative displacement of the battery easily occurs with respect to the electronic apparatus. Or, the pin tip of the retractable pogo pin over-retracts when its inner spring is compressed due to the instant acceleration. At the moment, the pin tip of the retractable pogo pin temporarily separates from the contact pad of the battery, which results in the interruptions of electricity transmission or electrical signal transmission. Such electricity interruption causes an abnormal shutdown to the electronic apparatus upon operation, which is easy to damage the hardware circuits or the software programs of the electronic apparatus.

To resolve this problem, TW Patent No. I354890 introduces a portable electronic apparatus capable of detecting housing separation. The electronic apparatus includes two housings (the main body and the battery of the electronic apparatus). When the two housing are separated from each other, a control module stops supplying power to the electronic apparatus. The solution introduced by TW Patent No. I354890 can only achieve a normal shutdown procedure under possible abnormal states of power supply, but is unable to prevent the problem of electricity interruption.

SUMMARY

Based on the problems of abnormal shutdown/reboot of the electronic apparatus when impacted by an external force causing instant electricity interruption, the embodiments of the disclosure provide an electrical connection assembly to reduce the probability of the instant electricity interruption problem occurring on the battery.

In one or more embodiments of the disclosure, an electrical connection assembly is provided to electrically connecting with at least one electrical contact of an electronic apparatus. The electrical connection assembly includes an insulating casing, a circuit board and a resilient conductive element.

An inner space is defined in the insulating casing, and at least one opening is defined on the insulating casing for communicating the inner space and the exterior of the insulating casing. The circuit board is disposed in the inner space of the insulating casing. The resilient conductive element has a connecting side for fixing on and electrically connecting with the circuit board. The resilient conductive element further includes a compressible side facing the at least one opening and being exposed therethrough.

When an external force is applied on the resilient conductive element, the thickness of the resilient conductive element is reduced. And when the external force is removed, the thickness of the resilient conductive element recovers.

In one or more embodiments of the disclosure, a battery device with the aforesaid electrical connection assembly is provided. The battery device includes an insulating casing, a battery pack, a circuit board and at least two resilient conductive elements.

An inner space is defined in the insulating casing, and plural openings are defined on the insulating casing for respectively communicating the inner space and the exterior of the insulating casing. The battery pack includes at least one battery cell. The battery pack is disposed in the inner space and has a positive electrode and a negative electrode. The circuit board is disposed in the inner space of the insulating casing; and the positive electrode and the negative electrode of the battery pack respectively connect with the circuit board. The at least two resilient conductive elements are disposed in the insulating casing, each corresponding to one of the openings and electrically connecting with the positive electrode and the negative electrode respectively. Each of the resilient conductive elements includes a connecting side for fixing on and electrically connecting with the circuit board, and for electrically connecting with one of the positive electrode and the negative electrode. Each of the resilient conductive elements respectively has a compressible side facing the opening and being exposed therethrough. The thickness of each of the resilient conductive elements is reduced when an external force is applied thereon, and the thickness recovers when the external force is removed.

In one or more embodiments of the disclosure, an electronic apparatus is further provided. The electronic apparatus includes a main body, plural electrical contacts and a battery device.

The main body includes a battery base; the electrical contacts are disposed in the battery base.

The battery device is disposed in the battery base. The battery device includes an insulating casing, a battery pack, a circuit board and at least two resilient conductive elements which are elastically deformable.

The insulating casing is disposed in the battery base. An inner space is defined in the insulating casing; and plural openings are defined on the insulating casing for respectively communicating the inner space and the exterior of the insulating casing. The battery pack includes at least a battery cell and is disposed in the inner space. The battery pack has a positive electrode and a negative electrode. The circuit board is disposed in the inner space of the insulating casing. The positive electrode and the negative electrode of the battery pack are respectively connected with the circuit board. The two resilient conductive elements are disposed in the insulating casing, each corresponding to one of the openings and electrically connecting with the positive electrode and the negative electrode respectively. Each of the resilient conductive elements includes a connecting side for fixing on and electrically connecting with the circuit board, and for electrically connecting with one of the positive electrode and the negative electrode. Each of the resilient conductive elements respectively has a compressible side facing the opening and exposing on a surface of the insulating casing through the opening. The thickness of each of the resilient conductive elements is reduced when an external force is applied thereon, and the thickness recovers when the external force is removed.

By recovering the thickness of the resilient conductive element, electrical contacts like the retractable pogo pins are able to continuously remain electrically connection with the resilient conductive element, so that electronic apparatus does not have the abnormal shutdown/reboot problem caused by the impact of the external force and the possibility of damaging the electronic apparatus is further reduced.

BRIEF DESCRIPTION OF THE DRAWINGS

The disclosure will become more fully understood from the detailed description given herein below for illustration only, and thus not limitative of the present invention, wherein:

FIG. 13 is a cross-sectional view of the electrical connection assembly according to the fourth embodiment, illustrating the pressed state of the electrical connection assembly.

DETAILED DESCRIPTION

Figure 1:
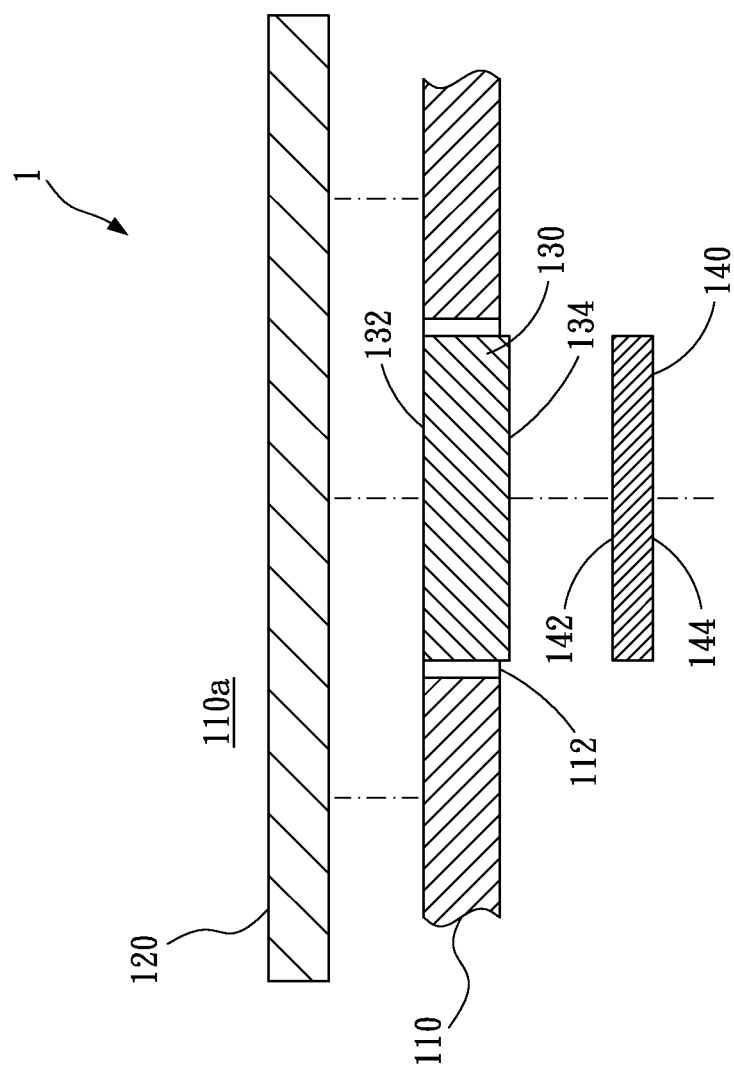
FIG. 1 is a cross-sectional explosive view of an electrical connection assembly according to a first embodiment of the disclosure.

Please refer to FIG. 1, FIG. 2, FIG. 3 and FIG. 4, which illustrate an electrical connection assembly 1 according to a first embodiment of the disclosure. The electrical connection assembly 1 is adapted to electrically connect with the electrical contacts of an electronic apparatus 3, such as a retractable pogo pin 320. In a practical embodiment, the electrical connection assembly 1 is applied to a battery device 2 for supplying electricity to the electronic apparatus 3 (referring to FIG. 6 and FIG. 7). The electrical connection assembly 1 includes an insulating casing 110, a circuit board 120, a resilient conductive element 130 which is elastically deformable and at least a contact terminal 140.

Figure 2:
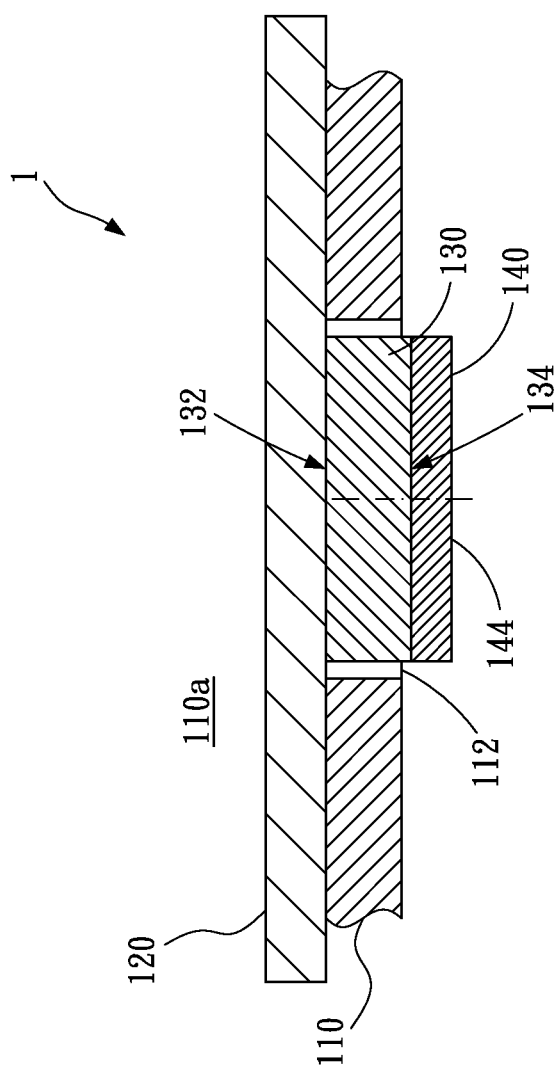
FIG. 2 is a cross-sectional view of the electrical connection assembly according to the first embodiment of the disclosure.

As shown in FIG. 1 and FIG. 2, the insulating casing 110 has an inner space 110a defined therein, and the insulating casing 110 also includes at least an opening 112 defined thereon for communicating the inner space 110a and the exterior of the insulating casing 110. The circuit board 120 is disposed in the inner space 110a of the insulating casing 110. Conductive circuits are disposed on the circuit board 120 as circuits for transmitting electricity or electrical signals.

As shown in FIG. 1 and FIG. 2, the resilient conductive element 130 may be realized by an elastomer with deformation elasticity; the resilient conductive element 130 has electrical conductivity. In a practical example, the resilient conductive element 130 includes a flame-retardant sponge block and a conductive layer covering on the flame-retardant sponge block; the conductive layer may be realized by a metal coating layer, a piece of carbon fiber cloth, a piece of metal wire cloth, a piece of conductive rubber, etc.

As shown in FIG. 1 and FIG. 2, the resilient conductive element 130 is fixed on the circuit board 120 and connected with the conductive circuits on the circuit board 120. The resilient conductive element 130 is disposed in the insulating casing 110, corresponding to the opening 112. The resilient conductive element 130 includes a connecting side 132 and a compressible side 134. The connecting side 132 is fixed on a surface of the circuit board 120 and connected with the conductive circuits of the circuit board 120, thereby fixing the resilient conductive element 130 on the circuit board 120. The compressible side 134 faces the opening 112 and exposes on a surface of the insulating casing 110 through the opening 112. The thickness of the resilient conductive element 130 is able to be reduced when an external force is applied thereon, and the thickness of the resilient conductive element 130 is able to recover when the external force is removed.

As shown in FIG. 1 and FIG. 2, the contact terminal 140 is made of solid conductive material. In a practical example, the contact terminal 140 is made of metal. The contact terminal 140 includes a first surface 142 and a second surface 144. The first surface 142 is connected with the compressible side 134 of the resilient conductive element 130, so that the second surface 144 faces the opening 112 and exposes on the surface of insulating casing 110 through the opening 112. When the second surface 144 is pressed by an external force applied toward the interior of the insulating casing 110, through the contact terminal 140 the external force is able to be distributed onto the compressible side 134 of the resilient conductive element 130, so that the resilient conductive element 130 is pressed moderately to reduce its thickness and retract toward the interior of the insulating casing 110. When the external force is removed, the resilient conductive element 130 is able to recover to its original thickness.

Figure 3:
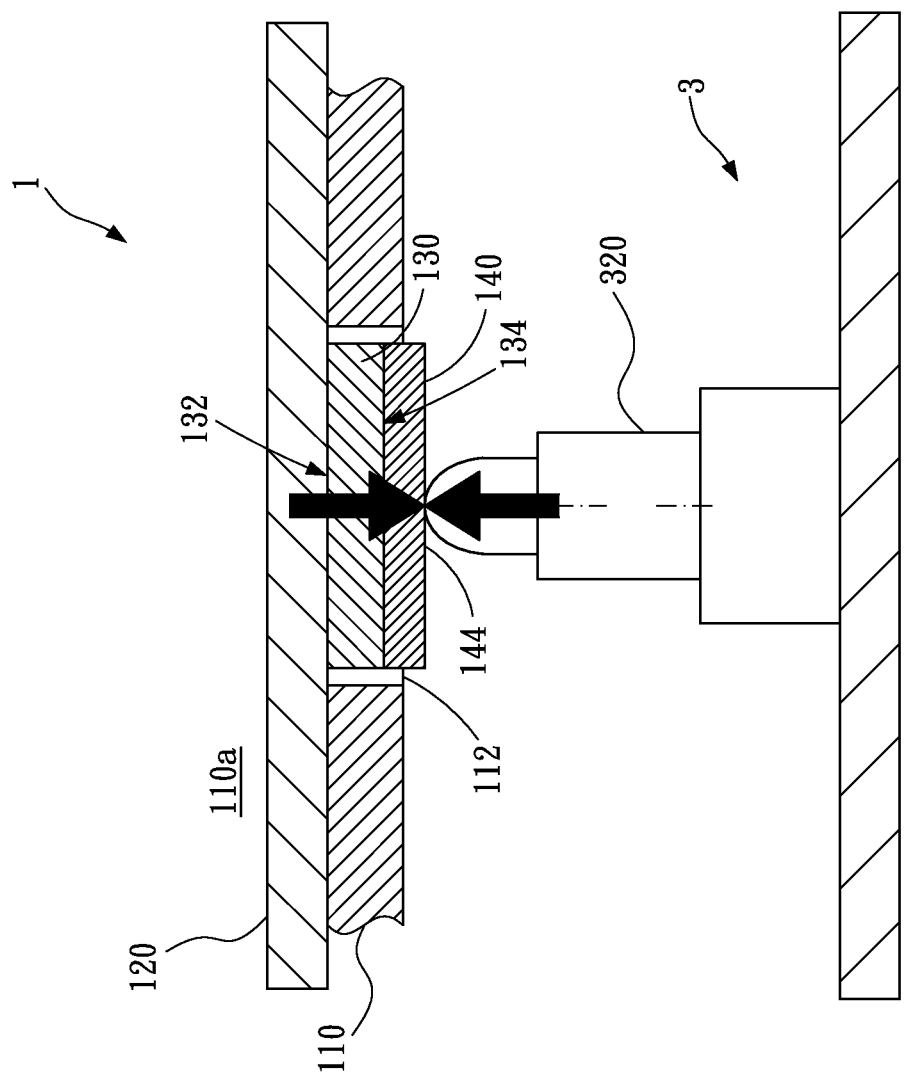
FIG. 3 is a cross-sectional view of the electrical connection assembly according to the first embodiment of the disclosure, illustrating the pressed state of the electrical connection assembly.

As shown in FIG. 3, when the electrical connection assembly 1 is used to electrically connect with the retractable pogo pin 320 of the electronic apparatus 3, the insulating casing 110 presses toward the electronic apparatus 3 so that the retractable pogo pin 320 contacts the contact terminal 140, and makes the retractable pogo pin 320 and the resilient conductive element 130 press toward each other. At this moment, the retractable pogo pin 320 contacts the second surface 144 of the contact terminal 140, pressing the first surface 142 of the contact terminal 140 to compress the resilient conductive element 130, so that the resilient conductive element 130 is elastically deformed with its thickness reduced, and in total retract toward the interior of the insulating casing. In the meantime, the compressed resilient conductive element 130 has an elastic recovering force generally therein to push on the contact terminal 140, so that the contact terminal 140 and the retractable pogo pin 320 can remain a well contact in between. Therefore, the resilient conductive element 130 and the retractable pogo pin 320 are able to electrically connect with each other through the contact terminal 140, thereby achieving the electrical connection between the retractable pogo pin 320 and the circuit board 120.

Figure 4:
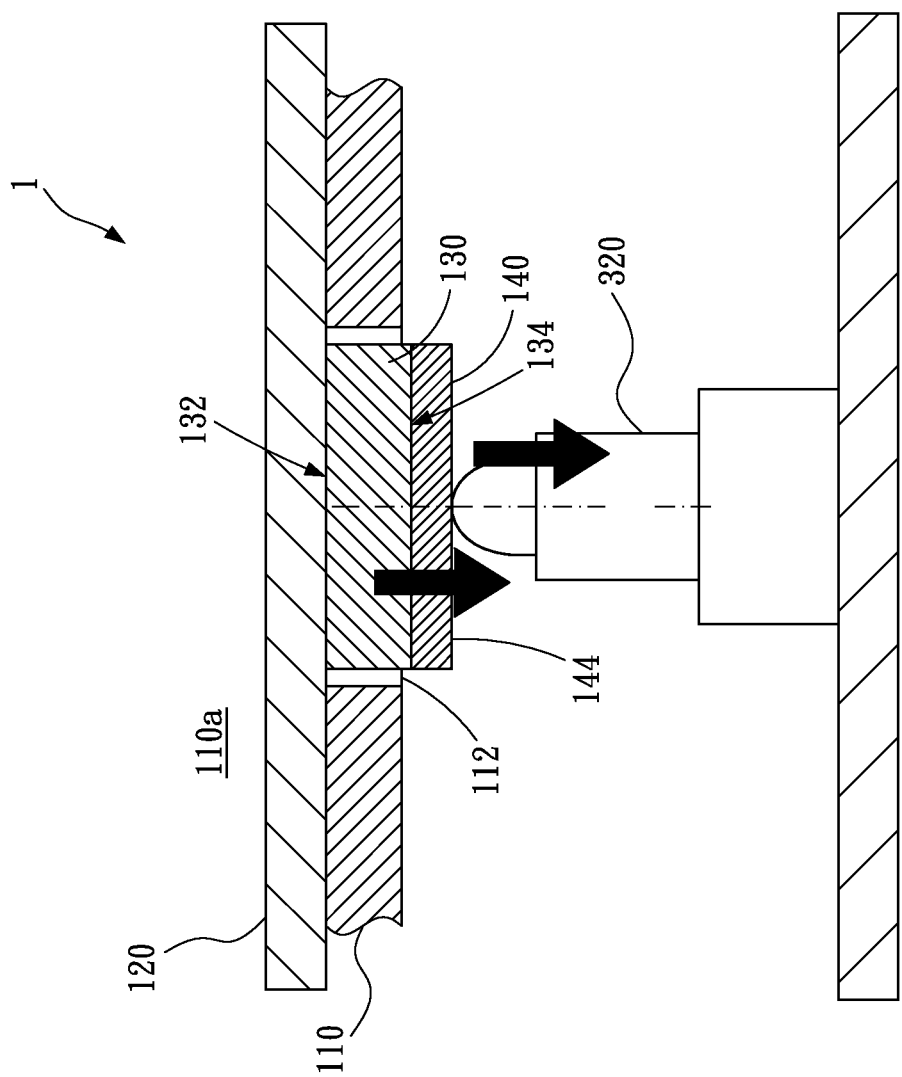
FIG. 4 is a cross-sectional view of the electrical connection assembly according to the first embodiment of the disclosure, illustrating the retracted state of the retractable pogo pin when impacted by an external force.

As shown in FIG. 4, when the electronic apparatus 3 is impacted by an external force, it is possible that the contact tip of retractable pogo pin 320 retract inwardly. In such situation, the resilient conductive element 130 elastically recovers back to the original thickness before being pressed and pushes the contact terminal 140 outwardly, so that the contact terminal 140 is able to constantly well contact with the retractable pogo pin 320 without causing the interruption problems of electricity or signal transmissions.

Figure 5:
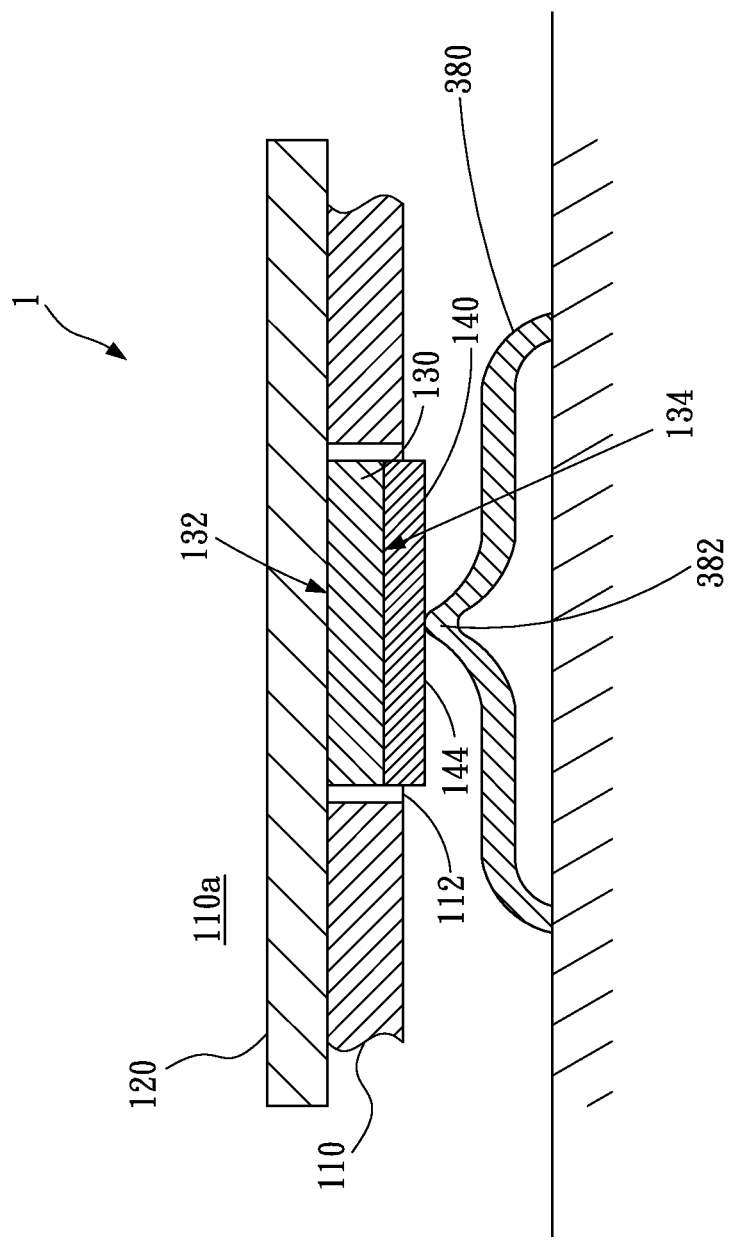
FIG. 5 is a cross-sectional view of an electrical connection assembly according to an applicable example of the first embodiment.

As shown in FIG. 5, the electrical contacts of electronic apparatus 3 are not limited to the retractable pogo pin 320 only. In an applicable example, the electrical contact may be realized by a spring piece 380 with an elastic convex point 382. The elastic convex point 382 is to contact the contact terminal 140, deforming and compressing the spring piece 380, thereby remaining well contacting with the contact terminal 140.

Figure 6:
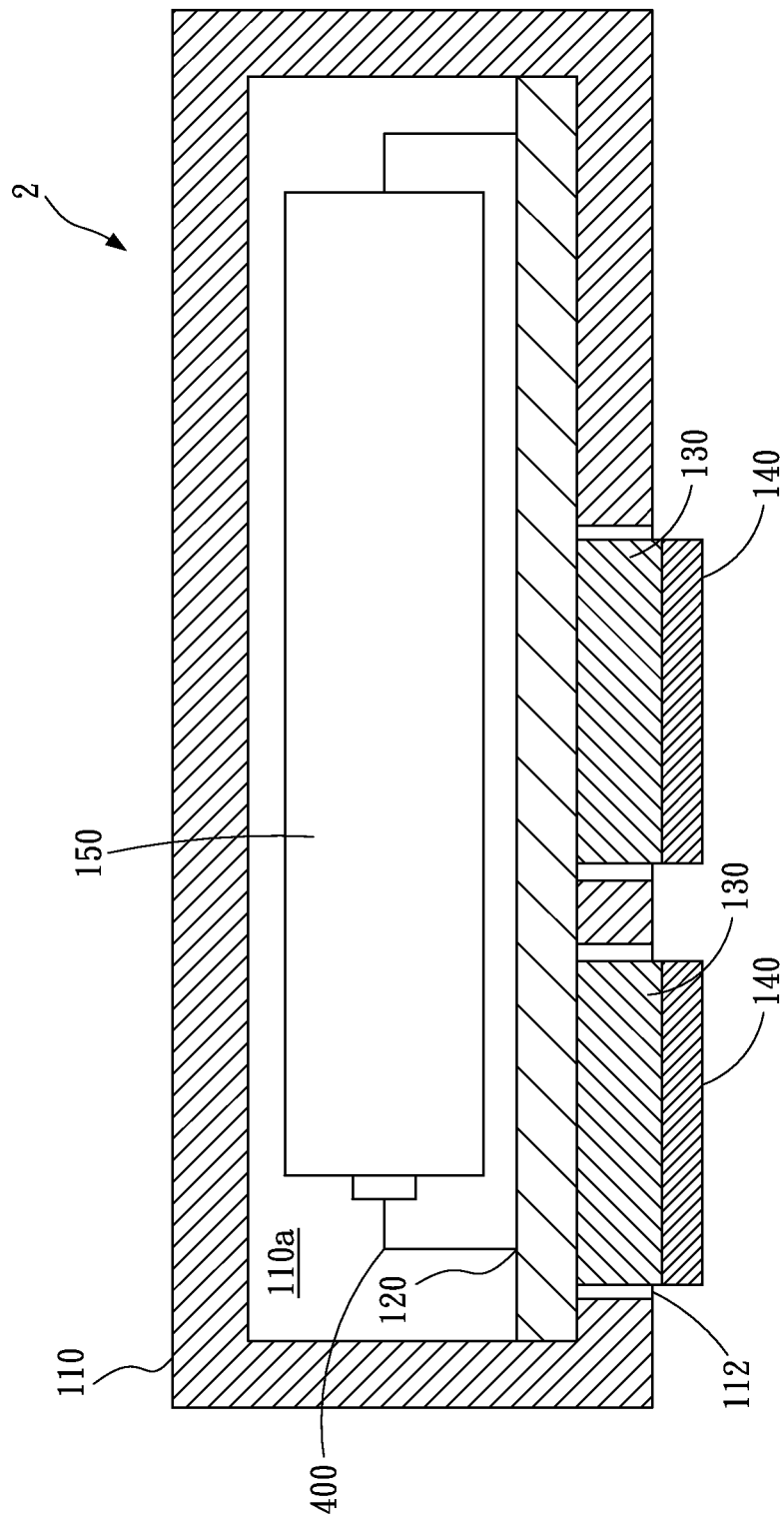
FIG. 6 is a cross-sectional view of a battery device according to the first embodiment.
Figure 7:
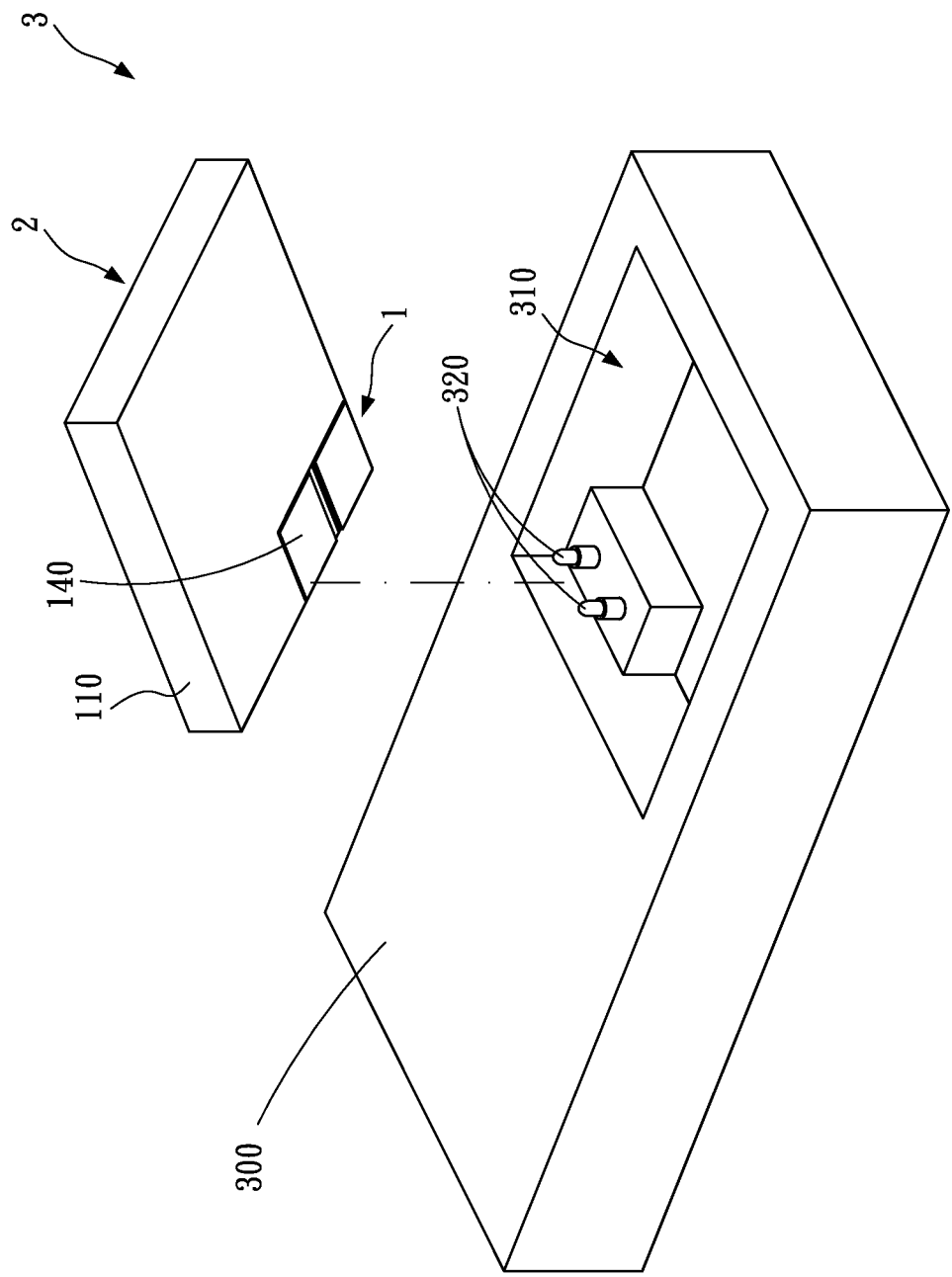
FIG. 7 is a cross-sectional view of an electronic apparatus according to the first embodiment.

As shown in FIG. 6 and FIG. 7, the first embodiment of the disclosure further introduces a battery device 2 and an electronic apparatus 3. The battery device 2 electrically connects with electrical contact(s) of an electronic apparatus 3, such as the retractable pogo pin 320, for providing electricity to the electronic apparatus 3. The battery device 2 includes an insulating casing 110, a circuit board 120, a battery pack 150, multiple resilient conductive elements 130 and multiple contact terminals 140.

As shown in FIG. 6 and FIG. 7, the insulating casing 110 includes multiple openings 112, each communicating the inner space 110a and the exterior of the insulating casing 110 respectively. The battery pack 150 includes at least a battery cell; the battery pack 150 is disposed in the inner space 110a of the insulating casing 110. The battery pack 150 at least includes a positive electrode and a negative electrode for supplying electricity. The circuit board 120 is disposed in the inner space 110a of the insulating casing 110. The positive electrode and the negative electrode of the battery pack 150 are respectively connected with the circuit board 120.

The insulating casing 110 includes multiple openings 112, each corresponding to one of the resilient conductive elements 130 respectively. Each of the contact terminals 140 respectively corresponds to one of the resilient conductive element 130. In a practical example, the amount of the resilient conductive element 130 corresponds to the specification of the battery pack 150. In the present embodiment, the battery device 2 includes two resilient conductive elements 130, each connecting with the positive electrode and the negative electrode respectively. In at least one of other applicable examples, aside from the positive electrode and the negative electrode, the battery pack 150 further includes multiple signal transmission contacts 400 for transmitting the statuses of every battery cell to the electronic apparatus 3; in such an applicable example, the battery device 2 includes more than two resilient conductive elements 130, each corresponding to the positive electrode, the negative electrode and each of the signal transmission contacts 400.

As shown in FIG. 7, the electronic apparatus 3 includes a main body 300, multiple electrical contacts and a battery device 3. The main body 300 includes a battery base 310. The battery base 310 includes a recessed space on the main body 300. The electrical contacts, such as retractable pogo pins 320, are disposed in the battery base 310 and each corresponding to one of the resilient conductive elements 130.

The battery device 2 is disposed in the battery base 310 in a replaceable manner. The complete or partial exterior shapes of the battery device 2 matches the recessed space of the battery base 310, so when disposed on the battery base 310, the battery device 2 is perfectly accommodated in the recessed space of the battery base 310.

When the battery device 2 is accommodated in the battery base 310, each retractable pogo pin 320 contacts the first surface 142 of the contact terminal 140, forcing the retractable pogo pin 320 and the corresponding resilient conductive element 130 compress each other, thereby connecting the battery pack 150 with the electronic apparatus 3 and transmitting electricity through the resilient conductive element 130 and the contact terminal 140.

Figure 8:
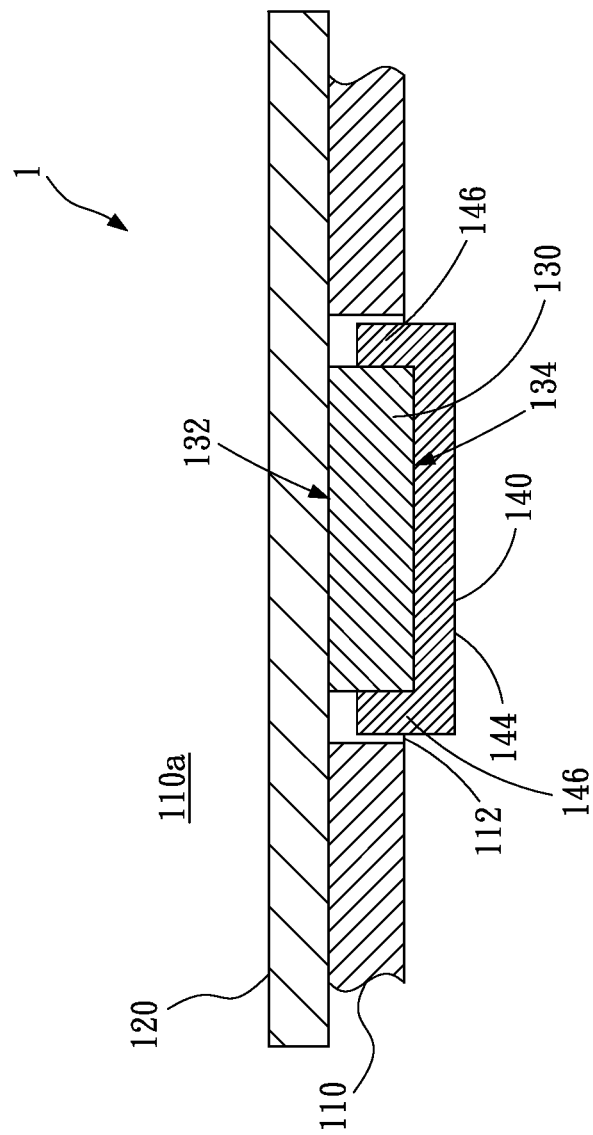
FIG. 8 is a cross-sectional view of an electrical connection assembly according to a second embodiment of the disclosure.
Figure 9:
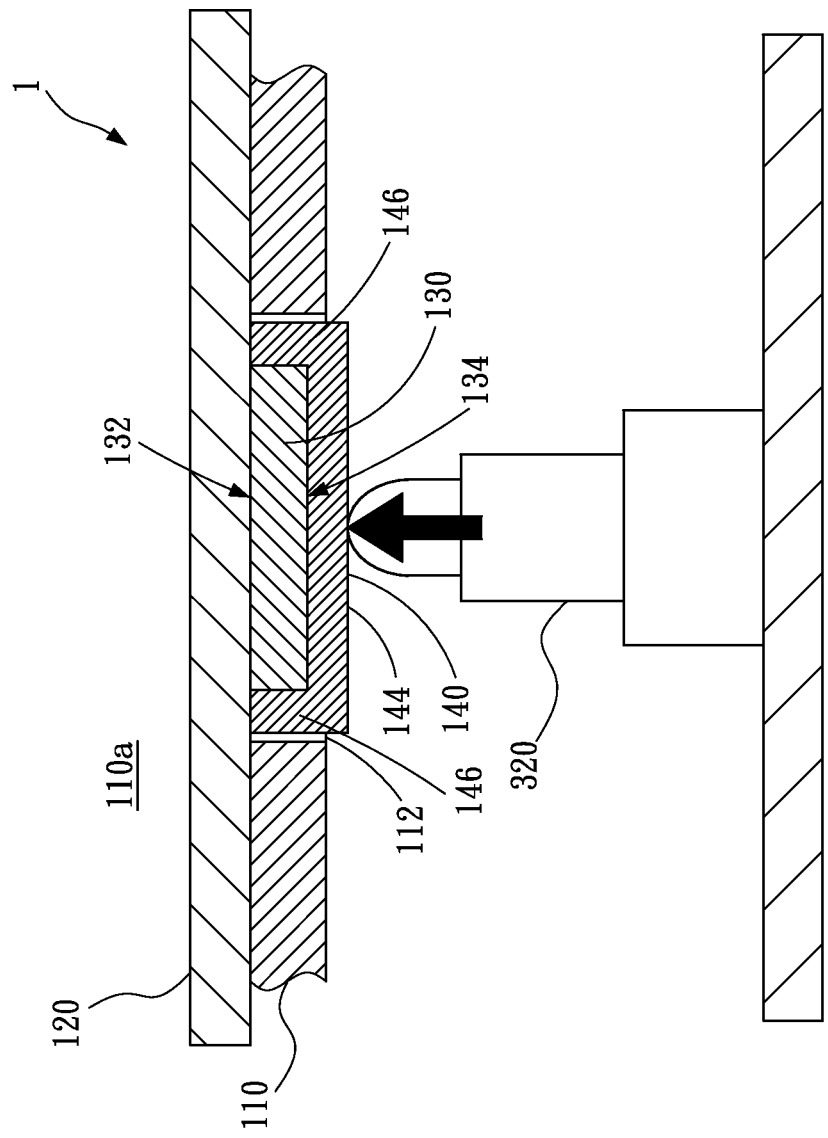
FIG. 9 is a cross-sectional view of the electrical connection assembly according to the second embodiment, illustrating the pressed state of the electrical connection assembly.

Please refer to FIG. 8 and FIG. 9, which illustrate an electrical connection assembly 1 applicable to the battery device 2 according to a second embodiment of the disclosure. Here the electrical connection assembly 1 is similar to the one in the first embodiment; the differences are described as follows. In the second embodiment, each contact terminal 140 further includes a cover piece 146 extending from an edge of the first surface 142. The cover piece 146 is bended to be vertical to the first surface 142 and to cover on at least a side of the resilient conductive element 130, preferably covering on the two opposite sides or the complete peripheral sides of the resilient conductive element 130. Therefore, the combination force between the resilient conductive element 130 and the contact terminal 140 is strengthened, and during the retracting and recovering processes of the resilient conductive element 130, the abrasions of the resilient conductive element 130 by the frictions between the peripheral of the resilient conductive element 130 and the opening 112 are able to be prevented.

Figure 10:
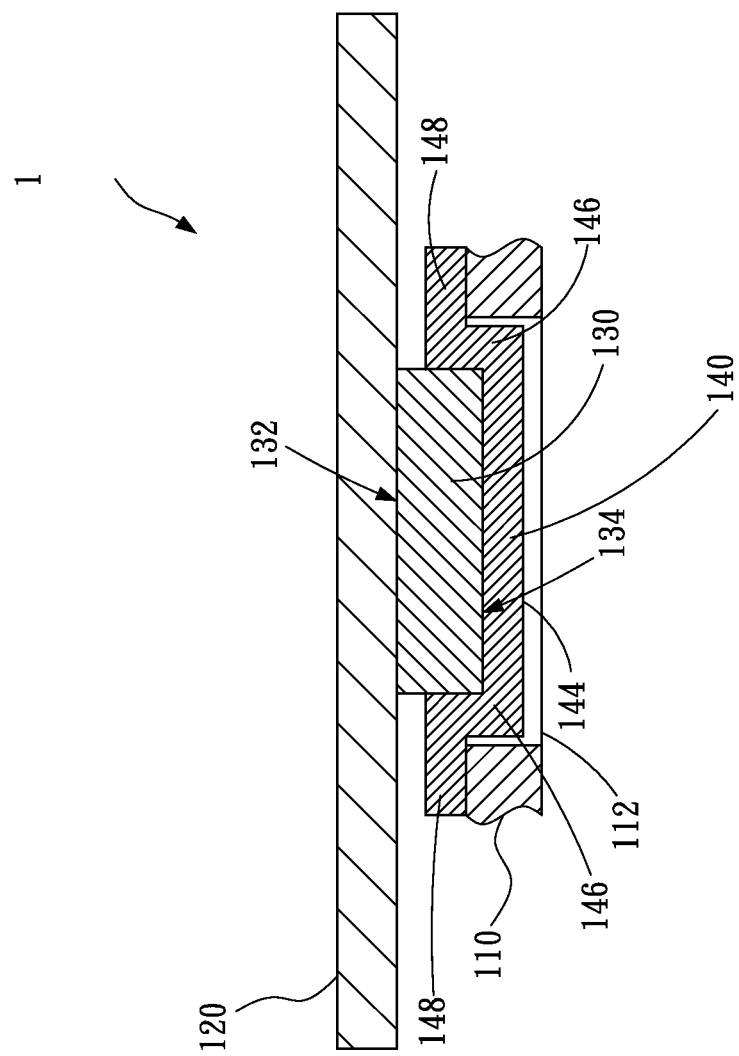
FIG. 10 is a cross-sectional view of an electrical connection assembly according to a third embodiment of the disclosure.
Figure 11:
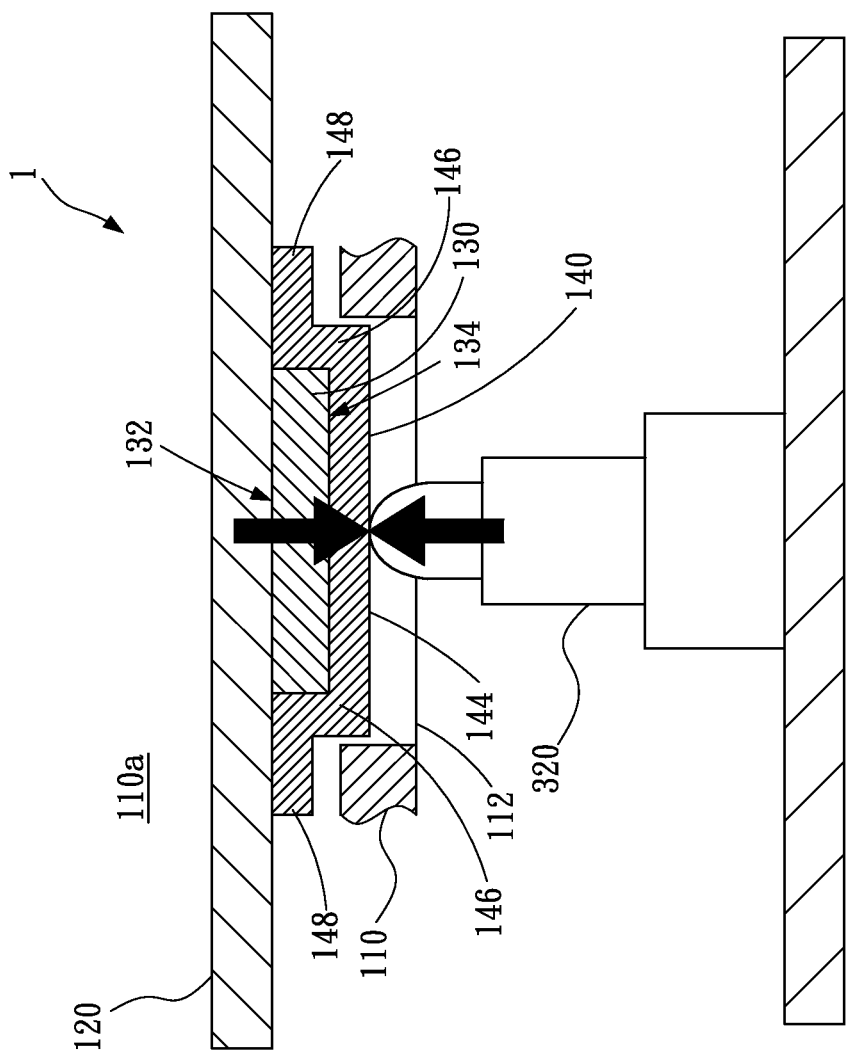
FIG. 11 is a cross-sectional view of the electrical connection assembly according to the third embodiment, illustrating the pressed state of the electrical connection assembly.

Please refer to FIG. 10 and FIG. 11, which illustrate an electrical connection assembly 1 applicable to a battery device 2 according to a third embodiment of the disclosure. Here the electrical connection assembly 1 is similar to the one in the second embodiment; the differences are described as follows. In the third embodiment, each contact terminal 140 further includes a stopper piece 148, extending from a side edge of the cover piece 146; preferably, the stopper piece 148 is approximately vertical to the cover piece 146. The stopper piece 148 is located in the inner space 110a of the insulating casing 110, with its edge exceeds a range of the opening 112. The stopper piece 148 is used to lean on an inner surface of the insulating casing 110, thereby preventing the contact terminal 140 from falling off through the opening 112. Also, the stopper piece 148 provides a prepressing force on the resilient conductive element 130, so as to strengthen the compression force of the resilient conductive element 130 and the retractable pogo pin 320.

Figure 12:
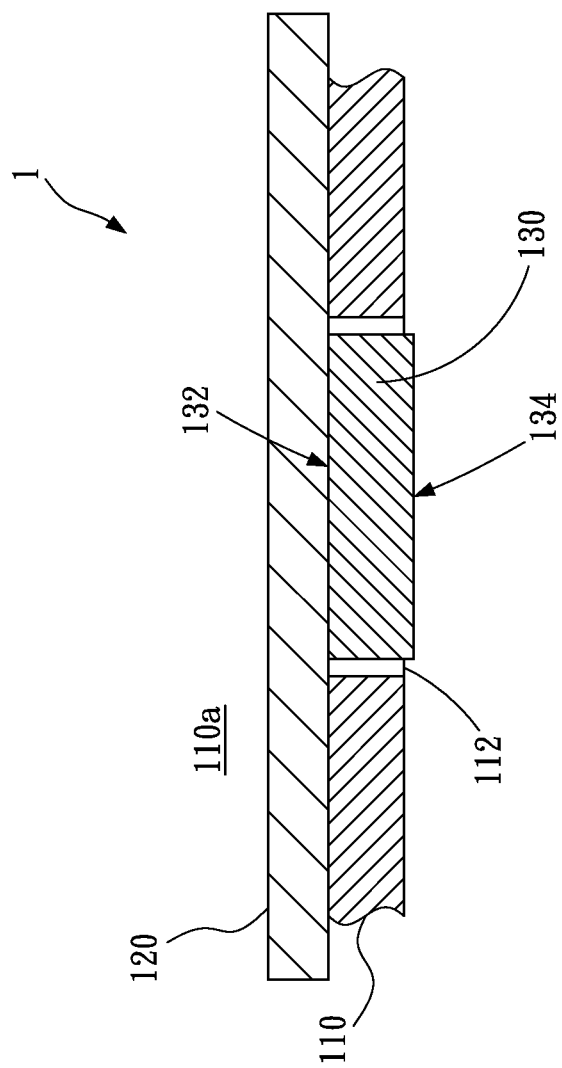
FIG. 12 is a cross-sectional view of an electrical connection assembly according to a fourth embodiment of the disclosure.

Please refer to FIG. 12 and FIG. 13, which illustrate an electrical connection assembly 1 applicable to a battery device 2 according to a fourth embodiment of the disclosure.

In the fourth embodiment, the contact terminal 140 is omitted so the compressible side 134 of the resilient conductive element 130 directly contacts with the retractable pogo pin 320.

By disposing the resilient conductive element 130, when the electronic apparatus 3 is impacted by an external force, and the electrical contact such as the retractable pogo pin 320 is about to separate from the battery device 2, the elastic recovering of resilient conductive element 130 makes the electrical contact remain electrically connected with the resilient conductive element 130, thereby continuously transmitting electricity between the battery device 2 and the electronic apparatus 3, and preventing the electronic apparatus 3 from abnormal shutdown/reboot problems caused by external impacts.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A battery device, comprising:
   an insulating casing, having an inner space and a plurality of openings, each of the openings respectively communicates the inner space and the exterior of the insulating casing;
   a battery pack, having at least one battery cell and being disposed in the inner space, and the battery pack has a positive electrode and a negative electrode;
   a circuit board, disposed in the inner space of the insulating casing, the positive electrode and the negative electrode of the battery pack respectively connecting with the circuit board;
   at least one resilient conductive element disposed in the insulating casing and corresponding to one of the openings, the at least one resilient conductive elements having a connecting side for fixing on and electrically connecting with the circuit board, and for electrically connecting with one of the positive electrode and the negative electrode, the at least one resilient conductive element having a compressible side facing the opening and being exposed therethrough; and
   at least one contact terminal, corresponding to the at least one resilient conductive element, the at least one contact terminal having a first surface and a second surface, the first surface connecting with the compressible side of the at least one resilient conductive element, and the second surface facing a corresponding one of the openings;
   wherein the thickness of the at least one resilient conductive element is reduced along a direction perpendicular to the corresponding one of the openings when an external force is applied on the at least one contact terminal and recovers when the external force is removed.

2. The battery device according to claim 1, wherein the at least one contact terminal further comprises at least one cover piece extending from an edge of the first surface of the at least one contact terminal and covering at least one side of the resilient conductive element.

3. The battery device according to claim 2, wherein the at least one contact terminal further comprises at least one stopper piece extending from a side edge of the cover piece, the stopper piece is located in the inner space for leaning on an inner surface of the insulating casing, thereby preventing the at least one contact terminal from falling off through the opening.

4. The battery device according to claim 3, wherein an edge of the stopper piece exceeds a range of the opening.

5. The battery device according to claim 1, wherein the battery pack further comprises at least one signal transmission contact connecting with the circuit board, and the at least one resilient conductive element is fixed on the circuit board and electrically connected with the signal transmission contact.

6. An electronic apparatus, comprising:
   a main body, having a battery base;
   a plurality of electrical contacts, disposed in the battery base; and
   a battery device, disposed in the battery base, the battery device comprising:
   an insulating casing, disposed in the battery base, an inner space being defined in the insulating casing, and a plurality of openings being defined on the insulating casing for respectively communicating the inner space and the exterior of the insulating casing;
   a battery pack, having at least one battery cell disposed in the inner space, and the battery pack having a positive electrode and a negative electrode;
   a circuit board, disposed in the inner space of the insulating casing, the positive electrode and the negative electrode of the battery pack respectively connecting with the circuit board;
   at least one resilient conductive element, disposed in the insulating casing and each corresponding to one of the openings respectively, the at least one resilient conductive element having a connecting side for fixing on and electrically connecting with the circuit board, and for electrically connecting with one of the positive electrode and the negative electrode, the at least one resilient conductive element having a compressible side for facing the opening and being exposed therethrough so as to be pressed by each of the electrical contacts; and
   at least one contact terminal, corresponding to the at least one resilient conductive element, the at least one contact terminal having a first surface and a second surface, the first surface connecting with the compressible side of the at least one resilient conductive element, and the second surface facing a corresponding one of the openings;
   wherein the thickness of the at least one resilient conductive element is reduced along a direction perpendicular to the corresponding one of the openings when the electrical contact presses thereon and recovers when the electrical contact is removed.

7. The electronic apparatus according to claim 6, wherein the at least one contact terminal further comprises at least one cover piece extending from an edge of the first surface of the at least one contact terminal and covering at least one side of the resilient conductive element.

8. The electronic apparatus according to claim 7, wherein the at least one contact terminal further comprises at least one stopper piece extending from a side edge of the cover piece, the stopper piece is located in the inner space for leaning on an inner surface of the insulating casing, thereby preventing the at least one contact terminal from falling off through the opening.

9. The electronic apparatus according to claim 8, wherein an edge of the stopper piece exceeds a range of the opening.

10. The electronic apparatus according to claim 6, wherein each of the electrical contacts is a retractable pogo pin or a spring piece with an elastic convex point.

11. The electronic apparatus according to claim 6, wherein the battery pack further comprises at least one signal transmission contact connecting with the circuit board, and the at least one resilient conductive element is fixed on the circuit board and electrically connected with the signal transmission contact.

12. The electronic apparatus according to claim 1, wherein the at least one resilient conductive element is a sponge block with electrical conductivity.

13. The electronic apparatus according to claim 6, wherein the at least one resilient conductive element is a sponge block with electrical conductivity.

\* \* \* \* \*